(12) United States Patent
Cheng et al.

(10) Patent No.: US 7,893,115 B2
(45) Date of Patent: *Feb. 22, 2011

(54) DEFOAMER EMULSION COMPOSITIONS FOR PULP MILL APPLICATIONS

(75) Inventors: Huai N. Cheng, Avondale, PA (US); Eric O. Fernandez, Jacksonville, FL (US); John M. Sheepy, Ontario (CA)

(73) Assignee: Hercules Incorporated, Wilmington, DE (US)

( * ) Notice: Subject to any disclaimer, the term of this patent is extended or adjusted under 35 U.S.C. 154(b) by 955 days.

This patent is subject to a terminal disclaimer.

(21) Appl. No.: 11/297,025

(22) Filed: Dec. 8, 2005

(65) Prior Publication Data

US 2006/0128816 A1 Jun. 15, 2006

Related U.S. Application Data

(60) Provisional application No. 60/635,359, filed on Dec. 10, 2004.

(51) Int. Cl.
*B01D 19/04* (2006.01)
*D21H 17/13* (2006.01)
*D21H 21/12* (2006.01)
*B01F 3/08* (2006.01)
*C08L 83/04* (2006.01)
*B01F 3/12* (2006.01)

(52) U.S. Cl. ............... 516/117; 516/118; 516/120; 516/22; 524/588; 162/72; 162/75; 162/158; 162/164.4; 162/179

(58) Field of Classification Search ............... 516/117, 516/118, 119, 120, 121, 22; 44/308; 162/72, 162/75, 158, 164.4, 179; 524/588
See application file for complete search history.

(56) References Cited

U.S. PATENT DOCUMENTS

| | | | |
|---|---|---|---|
| 3,076,768 A | 2/1963 | Boylan | |
| 3,336,231 A | 8/1967 | Marsh et al. | |
| 3,677,963 A | 7/1972 | Lichtmann et al. | |
| 3,697,442 A | 10/1972 | Liberman | |
| 3,925,242 A * | 12/1975 | Sagi et al. | 516/121 |
| 4,024,072 A * | 5/1977 | Shane et al. | 516/123 |
| 4,028,218 A | 6/1977 | Fink et al. | |
| 5,229,033 A | 7/1993 | Nguyen et al. | 516/130 |
| 5,510,409 A | 4/1996 | Romano | 524/322 |
| 5,645,762 A | 7/1997 | Cook et al. | |
| 5,846,454 A * | 12/1998 | Koczo et al. | 516/11 |
| 5,990,181 A * | 11/1999 | Spyropoulos et al. | 516/118 |
| 6,177,481 B1 | 1/2001 | Grape et al. | 516/124 |
| 6,265,456 B1 * | 7/2001 | Austin et al. | 521/112 |
| 6,656,975 B1 * | 12/2003 | Christiano et al. | 516/22 |
| 2003/0072776 A1 | 4/2003 | Sun et al. | 424/401 |
| 2004/0180806 A1 | 9/2004 | Esselbrugge et al. | 510/475 |
| 2006/0128884 A1 | 6/2006 | Cheng et al. | 524/588 |

FOREIGN PATENT DOCUMENTS

| | | |
|---|---|---|
| CN | 1060768 A | 5/1992 |
| DE | 23 45 335 | 4/1975 |
| DE | 32 42 202 | 6/1983 |
| DE | 41 20 961 | 1/1993 |
| DE | 42 43 272 | 6/1994 |
| DE | 197 41 912 | 9/1997 |
| DE | 19741912 C1 | 11/1998 |
| EP | 0 523 418 | 1/1993 |
| EP | 0 559 319 | 9/1993 |
| EP | 0 905 314 | 3/1999 |
| EP | 1075863 A2 * | 2/2001 |
| EP | 1075864 A2 * | 2/2001 |
| GB | 2 112 767 | 7/1983 |
| GB | 2 155 004 | 9/1985 |
| JP | 62241510 A | 10/1987 |
| JP | 62241511 A | 10/1987 |
| JP | 03044322 | 2/1991 |
| JP | 08-192001 * | 7/1996 |
| JP | HEI8-192001 | 7/1996 |
| JP | 09-173003 * | 7/1997 |
| JP | 9173003 | 7/1997 |
| JP | 2000 288308 | 10/2000 |
| WO | 00/61077 | 10/2000 |
| WO | WO 2004018073 A1 * | 3/2004 |
| WO | 2005/001471 | 1/2005 |

OTHER PUBLICATIONS

English Language Machine Translation of JP 08-192001 online @ http://www19.ipdl.inpit.go.jp/PA1/cgi-bin/PA1NUMBER , JPO Tokyo, Japan, (downloaded Dec. 2008), pp. 1-15.*
English Language Machine Translation of JP 09-173003 online @ http://www19.ipdl.inpit.go.jp/PA1/cgi-bin/PA1NUMBER , JPO Tokyo, Japan, (downloaded Dec. 2008), pp. 1-6.*

(Continued)

*Primary Examiner*—Daniel S Metzmaier
(74) *Attorney, Agent, or Firm*—Joanne Mary Fobare Rossi

(57) ABSTRACT

An oil-in-water emulsion useful as a defoamer for pulp and paper mill applications is described. The defoamer has an oil blend (of a triglyceride oil or a mixture of triglyceride oils and silicone), a stabilizing agent (to make the oil blend stable in the emulsion), hydrophobic silica particles, surfactants, dispersants, and other components. The emulsion is usable directly at low concentrations to control foam.

18 Claims, 1 Drawing Sheet

OTHER PUBLICATIONS

O'Neil, Maryadele J. et al. (© 2006, 2010), The Merck Index—An Encyclopedia of Chemicals, Drugs, and Biologicals (14th Ed.—Vers 14.6), Merck Sharp & Dohme Corp., Whitehouse Station, NJ (Knovel Date: Dec. 1, 2007), Entries 08731, 02533, & 01898, Online @ http://knovel.com/web/portal/browse/display?__EXT__KNOVEL__DISPLAY__bookid=1863&VerticalID=0.*

Lewis, Richard J., Sr. (2002) Hawley's Condensed Chemical Dictionary (14th Edition), John Wiley & Sons, Online @ http://knovel.com/web/portal/browse/display?__EXT__KNOVEL__DISPLAY__bookid=704&VerticalID=0, headword = soybean oil, corn oil, and castor oil, (Knovel Release Date: Sep 4, 2003; downloaded Dec. 3, 2010), pp. 1-2.*

McGee, James b., Water based Brownstock Antifoams, 24$^{th}$ EUCEPA Conference, Pulp Technology & Energy: May 8-11, 1990, pp. 322-330.

Pelton, R., A Review of Brownstock Defoamer Fundamentals, Pulp and Paper Canada, 90:2 (1989).

Allen, S.L., L.H. Allen and T.H. Flaherty, Defoaming in the Pulp and Paper Industry, Defoaming: Theory and Industrial Applications, ed. P.R. Garrett, Marcel Dell, New York, 1993, Chapter 3, pp. 151-175.

Chemical Abstracts 108: 74034j Novel defoamer for food manufacture Jpn. Kokai Tokkyo Koho (see JP 62,241,511 Abstract), pp. 565 (1988).

Chemical Abstracts 108: 74035k Defoamers for food manufacture Jpn. Kokai Tokkyo Koho (see JP 62,241,510 Abstract), pp. 565 (1988).

Chemical Abstracts 127: 80567u Storage-stable defoaming oil compositions for foods, Jpn. Kokai Tokkyo Koho (see JP 9,173,003 Abstract), vol. 127, No. 6, pp. 623 (1997).

Chemical Abstracts, 130:53956a, "Method for Producing Defoamers Based on Oils,"(1999.) Columbus, OH.

* cited by examiner

DEFOAMER EMULSION COMPOSITIONS FOR PULP MILL APPLICATIONS

This application claims the benefit of U.S. Provisional Application Ser. No. 60/635,359 filed on Dec. 10, 2004, the contents of which are hereby incorporated by reference.

BACKGROUND OF THE INVENTION

1. Field of the Invention

This invention relates to oil-in-water emulsions for use as defoamers in pulp and paper mill applications. The defoamer comprises an oil blend (of a triglyceride oil or a mixture of triglyceride oils and silicone), a stabilizing agent (to make the oil blend stable in the emulsion), hydrophobic silica particles, surfactants, dispersants, and other components. The emulsion is usable directly at low concentrations to control foam

2. Description of Related Art

Defoamers are needed in pulp and paper mills to 1) reduce unwanted foam and thereby enhance water drainage from the pulp mat, 2) minimize loss of process chemicals, and 3) increase equipment capacity. Continued improvement of defoamer technology is highly desirable, particularly with respect to cost effectiveness, compliance with environmental regulations, and reduction of unwanted contaminants in pulp and paper products.

Among defoaming applications, pulp and paper mill applications involving black liquors are considered the most challenging. Kraft black liquor is found at different concentrations and compositions in different Kraft mills and can even be different at different stages within the same mill. For illustration, a Kraft black liquor may contain 33% lignin, 27% organic acids, 23% inorganic components, 6% extractives (such as wood resins, fatty and resin acids, di- and triglycerides, steryl esters, sterols, etc.), and 11% bound sodium. Many of these components (such as fatty acids, lignin, and wood resin fractions) are natural foam stabilizers. Note that the fatty and resin acids are in saponified/salt forms at the alkaline pH of the black liquor. In addition, chemical additives also add to the surfactant load, especially in the paper mill. Particulates, such as paper fines and fillers can also stabilize foam under some conditions. Furthermore, the black liquor in the mill entails high temperatures and high pH.

Additional pulp and paper applications of defoamers include their use in sulfite pulping process and in effluent and other water treatment. For many of these applications, the use of triglyceride oils may be particularly attractive because they are perceived to be less toxic and more "green" than other oils. Deformers used in pulp and paper applications may also be used for other non-food industrial uses.

Whereas many defoamers are known, the most effective pulp mill defoamers are oil-in-water emulsions based on silicone. In an oil-in-water emulsion, water constitutes the continuous phase. A simplified silicone defoamer for pulp mill applications consists of four components: 1) water, 2) silicone, 3) hydrophobic silica particles, and 4) one or more dispersants, surfactants, and additives. Within this general scheme, there are a variety of different defoamer formulations possible, differing in the composition or functionality, number of components, nature of the materials chosen, and the process of manufacturing.

Defoamer emulsions are difficult to manufacture, requiring specific compositions and processes to produce stable emulsions. If the emulsion "breaks" and phase separation occurs, the defoamer decreases in efficacy, in addition to the problem of fouling and deposit formation. Thus, a successful defoamer emulsion has to satisfy the requirement of foam minimization and emulsion stability. It must also be microbiologically inert. In addition, if the defoamer emulsion can improve drainage, it has an enhanced value.

SUMMARY OF THE INVENTION

This invention relates to stable oil-in-water emulsion compositions that can be used for foam control in pulp and paper mill applications, comprising:
1) an oil blend of a triglyceride oil (or a mixture of triglyceride oils), and silicone oil or silicone material. The level of silicone oil or silicone material is greater than 2.5% by weight.
2) a stabilizing or compatibilizing agent for the triglyceride oil/silicone oil or silicone material blend
3) hydrophobic particles
4) surfactants and/or dispersants
5) water, at 51% by weight or higher In addition, other ingredients, such as thickeners and biocides, can be optionally added. All functional emulsion components, e.g. triglyceride oils, mixtures of triglyceride oils, silicone oils, silicone materials, stabilizing or compatibilizing agents, surfactants and dispersants, have flash points of 140° F. (60° C.) or higher.

Optionally pH adjustment is made on the defoamer emulsion, using acid or base, to a desired pH in order to improve the emulsion stability.

"Flash point" means the minimum temperature at which a liquid gives off vapor within a test vessel in sufficient concentration to form an ignitable mixture with air near the surface of the liquid, and shall be determined using the appropriate test methods. For liquids which have a viscosity of less than 45 SUS at 100 deg. F. (37.8 deg. C.), and which do not contain suspended solids, and do not have a tendency to form a surface film while under test, the appropriate test method is specified in the Standard Method of Test for Flashpoint by Tag Closed Tester (ASTM D-56-70) and should be used to determine the Flash point. For liquids which have a viscosity of 45 SUS or more at 100 deg. F. (37.8 deg. C.), or which contain suspended solids, or have a tendency to form a surface film while under test, the appropriate test method is specified in the Standard Method of Test for Flashpoint by Pensky-Martens Closed Tester (ASTM D-93-71) and should be used to determine the Flash point.

This invention also relates to the use of these emulsions in control of foam in pulp and paper applications.

The advantages of the defoamer compositions of the present application include 1) decreased use of silicone oil or silicone material, 2) lower cost, and 3) more favorable environmental profiles.

DETAILED DESCRIPTION OF THE INVENTION

Figure 1:
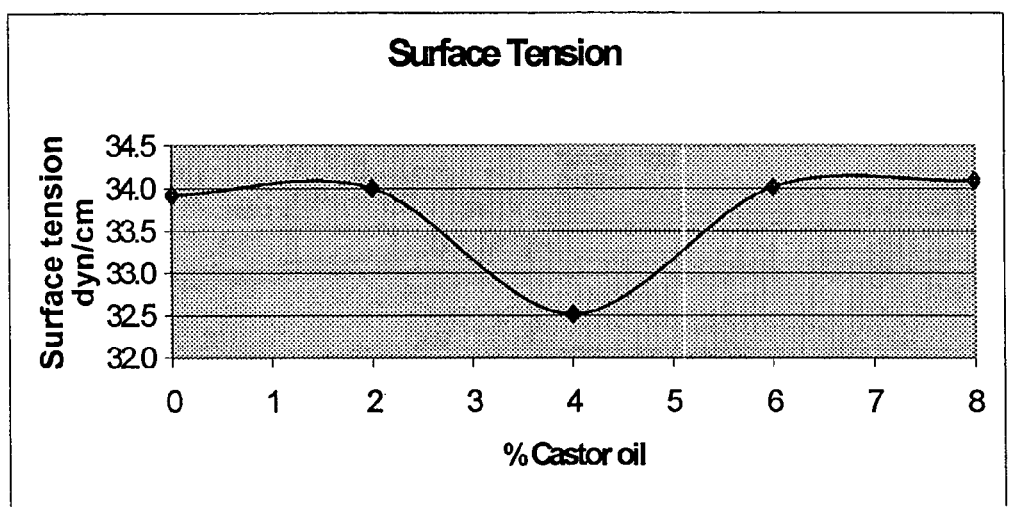
FIG. 1. is a graph of the surface tension of mixtures of soybean oil-castor oil at various concentrations.

All amounts are given by weight unless noted otherwise. Percentages are given as weight percentage of total weight. Ratios are given as weight ratios.

The defoamers of the present application relate to oil-in-water defoamer compositions, comprising water, an oil blend, a stabilizing or compatibilizing agent for the oil blend, hydrophobic particles, surfactants and/or dispersants, and other components in specific processes to form the oil-inwater emulsion. The oil blend comprises one or more triglyceride oils and one or more silicones. All functional emulsion components, e.g. triglyceride oils, mixtures of triglyceride oils, silicone materials, silicone oils, stabilizing or compatibilizing agents, surfactants and dispersants, have flash points of 140° F. (60° C.) or higher.

The present defoamer can be used to control foam produced in various pulp and paper applications. The defoamer can be used in other end use applications, such as for example controlling foam associated with textiles, detergents, and wastewater treatment.

The defoamer emulsions are compositions which are characterized as stable oil-in-water emulsions containing 51% or more by weight of water. A key characteristic of these defoamer emulsions is the use of an oil blend, comprising silicone, triglyceride oil, and a stabilizing agent, which are compatible with the formation of a stable oil-in-water emulsion. The composition contains no hydrocarbon oil or any other organic solvents with flash points of 140° F. (60° C.) or higher. The silicone content is at least about 2.5% by weight based on the weight of the emulsion (preferably greater than 5% by weight). Preferably it contains two or more surfactants to optimize the properties.

As stabilizing agent for the triglyceride oil and the silicone, a phospholipid is preferred; lecithin is more preferred. For example, methyl ester soybean oil and silicone oil are usually not compatible with each other (i.e., forming two separate phases). The addition of 1% lecithin increases the compatibility of methyl ester soybean oil and silicone oil by about 40%.

The defoamer compositions taught herein have utility in the control of foam in pulp and paper applications, preferably for defoaming black liquor produced in the pulp treatment and for the treatment of effluent water from pulp and paper mills.

The defoamer compositions of the present application exhibit several desirable features, which are selectively used for specific formulations that provide commercially viable products with good results. Some of the desirable features include 1) the use of oil blends, comprising one or more triglyceride oils, and one or more silicone oils or silicone materials, resulting in more environmentally friendly compositions and less costly materials; 2) hydrophobic silica and methods of preparing hydrophobic silica using more environmentally friendly materials.

In the oil-in-water emulsion, the composition of the oil blend varies from about 5 to 45% (preferably about 15 to about 40%), hydrophobic particles from about 0.05 to about 10.0% (preferably about 0.2—about 5.0%), surfactants and/or dispersants from about 0.1 to about 8.0% (preferably about 0.2—about 4.0%, and preferably two or more surfactants and/or dispersants), optionally thickeners from about 0 to about 5% (preferably about 0—about 2%), and optionally biocides from about 0 to about 5% (preferably about 0—about 3%). The minimum silicone level is about 2.5% by weight, preferably about 5% or higher. The water content in the emulsion is about 51% by weight or higher. All emulsion components have flash points of 140° F. (60° C.) or higher.

By "triglyceride oil", it is defined to mean oils from plant and animal sources, e.g., animal fat, soybean oil, corn oil, castor oil, and their mixtures. Also included are modified vegetable oils, e.g., methyl ester of soybean oil, and ethyl ester of soybean oil. The triglyceride oil mixtures used herein are compatible and do not phase separate. Thus, two oils can be blended at any weight ratio. For example, a mixture of soybean oil and castor oil will have the preferable weight ratio of about 96:4. For a mixture of methyl ester soybean oil and soybean oil, the preferable weight ratio is about 90:10.

The following terminology is used for the silicone-containing substances:

1. "Silicone oil" refers only to silicone oil comprising primarily polydimethylsiloxane, such as Dow Corning® 200 Fluids (Dow Corning Corporation, Midland Mich.), or General Electric's SF 96 fluids (Wilton, Conn.).

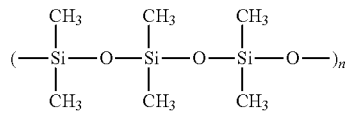

2. Modified silicone product, e.g., a grafted or crosslinked silicone polymeric system. An example is the silicone polyether, with the following structure:

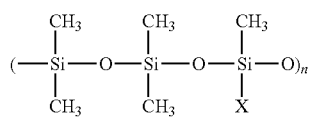

where X=polyether, such as poly(ethylene glycol), poly(propylene glycol) or copolymers. Many of these modified silicone products have surface active properties and are silicone surfactants.

3. Formulated silicone product. This contains a formulated mixture that comprises one of more silicone oils (as above), modified silicone products (as above), and silica or hydrophobic silica.

4. "Silicone material". This term refers to modified silicone product (as above) and/or formulated silicone product (as above).

5. "Silicone". This term refers to silicone oil and/or modified silicone product (as above) and/or formulated silicone product (as above).

The silicone used comprises from about 0-99% by weight of silicone oil (preferably about 0.5-80%), about 0-30% by weight of modified silicone products (preferably about 0.2-10%), and about 0-60% by weight of formulated silicone products (preferably about 0.2-45%). The total of the silicone oil, modified silicone products and the formulated silicone products must be approximately 99% of the silicone used. Some examples of modified silicone products are Dow Corning® Q2-5247, Dow Corning® 3581 Performance Modifier, Dow Corning® 3580 Performance Modifier, Dow Corning® 5329 Performance Modifier, Dow Corning® 2-5573 Performance Modifier (from Dow Corning Corporation, Midland, Mich.), ICM 14P, ICM 884, and ICM 280B (from ICM, Cassopolis, Mich.), SF1188A, DA 40, and DA 33 (from GE Silicones, Wilton, Conn.). Some examples of formulated silicone products are Pulpsil® 160 C and Pulpsil® 330C (from Wacker), Antifoam A, Pulpaid® 2000, Pulpaid® 3000, Pulpaid® 3379, Pulpaid® 3500, Pulpaid® 3550, Pulpaid® 3056, Pulpaid® 3600, Pulpaid® 3754, and Pulpaid® 3990 (all from Dow Corning Corporation, Midland Mich.), and Defoamer S-409-4 (from DeBourg Corp., Chicago, Ill.).

The term "stabilizing agent" refers to any material used in small quantities that decreases the tendency of the triglyceride oil and the silicone to separate into two phases in an emulsion. The stabilizing agent therefore includes an agent that compatibilizes the silicone and the triglyceride oil to form a single phase. The preferred stabilizing agent is a phospholipid. The more preferred stabilizing agent is lecithin. Another example of the stabilizing agent is a modified silicone product.

The term "thickener" refers to a polymeric material, which at a low concentration increases the viscosity of an aqueous solution and helps to stabilize the emulsion. Examples of thickeners are hydrophobically modified hydroxyethylcellulose (HMHEC), Hydrophobically Modified Alkali-Soluble Emulsion Polymer (HASE), hydrophobically modified urethane-ethoxylate resin (HEUR), xanthan gum, guar gum, methylcellulose, and carboxymethylcellulose.

The triglyceride oil and the silicone form an oil blend. The stabilizing agent allows the oil blend to remain stable in the emulsion. The weight ratio of the silicone and the triglyceride oil varies, and it can be from about 6:94 to about 90:10 and a preferential range is from about 14:86 to about 84:16. The weight of the stabilizing agent is preferably above about 0.1% and more preferably above about 0.5% based on the weight of the oil blend. The weight of the stabilizing agent is preferably below about 10% and more preferably below about 6.0% based on the weight of the oil blend.

In one embodiment, the defoamer emulsion contains a "base oil" blend, comprising triglyceride oil and asilicone oil mixture. In this embodiment, the ratio by weight of the triglyceride oil: silicone oil is from about 33:67 to about 50:50. The base oil together with a stabilizing agent is blended with surfactants and/or dispersants, and water to form a defoamer emulsion. This formulation is to be compared to a defoamer emulsion in which the base oil is made from silicone components, without the triglyceride oil (or fatty esters) and stabilizer. All other ingredients remain the same. Using the composition and the process disclosed herewith, defoaming efficacies were obtained for the defoamer emulsions that are roughly equivalent to the silicone defoamer wherein the base oil does not contain triglyceride oil.

In another embodiment, a minimum of about 2.5% silicone (in addition to triglyceride oil) is used for an effective defoamer. Without wishing to be bound by theory, it is believed that a minimum amount of silicone provides improvement for at least two reasons: 1) low surface tension, and 2) rapid transport of the silica particles. Different silicone oils or silicone materials can be used to produce favorable results. The emulsion system, which comprises a balanced composition of components (hydrophobic particles, silicone, triglyceride oil, phospholipid, surfactants, water, and other minor components) is then capable of effectively reducing foam Hydrophobic silica particles are the preferred hydrophobic particles of the emulsion composition. Examples of hydrophobic particles include, but are not limited to, ethylene bistearamide, natural or synthetic waxes and hydrophobic silica.

The hydrophobic silica optionally has a bimodal distribution of particle sizes, with average sizes of the particles of about 2 um and 110 um Hydrophobic silica is available commercially, e.g., Aerosil® R972 from Degussa Corporation (Parsippany, N.J.).

Typically, hydrophobic silica can be produced by baking a well-mixed blend of silica particles and one or more silicone oils (or, alternatively, by treating the silica particles with reactive silanes) at a prescribed high temperature. A variation is to use a silicon-containing surfactant, wholly or in part, in place of the silicone oil in the heat treatment mentioned above. Alternatively, a triglyceride oil may be applied on the surface of the silica particles to produce a hydrophobic silica.

Traditionally, hydrophobic silica materials used are based on silicone oil baked on silica It has surprisingly been discovered that it is possible to bake triglyceride oils onto silica to produce hydrophobic silica materials. Triglyceride oils normally do not react with silica. Indeed, when a triglyceride oil is heated with silica in nitrogen or under vacuum below 200° C., no substantial reaction is observed. It was found that when silica is minimally coated with either soybean oil or castor oil and heated in the presence of air at about 100° C. to 200° C. with silica particles, the oil does react with silica Without wishing to be bound by theory, it is believed that partial oxidation of the triglyceride oil facilitates binding of the triglyceride oil to the silica particles, rendering the silica particles hydrophobic. The preferred reaction temperature is about from about 120° C. to 170° C., and more preferred about 150° C. The resulting triglyceride oil-reacted silica particles float on deionized water, indicating their hydrophobic nature. Thus, a few grains of silica can be put on top of a beaker of deionized water. If the silica particle sinks, it is not hydrophobic. If the silica particle floats, it is hydrophobic.

Surfactants are an essential part of the defoamer emulsion. They contribute greatly to two functions: 1) minimizing foam, and 2) stabilizing the emulsion. In Kraft pulpmill foam, the foam lamellae are stabilized by natural foam stabilizers in the black liquor (e.g., fatty acids, lignin, and wood resin fractions). The surfactant displaces these natural foam stabilizers and thereby weakens or breaks the bubbles. With regard to the second function, a surfactant needs to disperse and stabilize the oil particles in water to form the emulsion. These two functions have different requirements, and the formulation preferably comprises two or more surfactants.

The preferred surfactants are the non-ionic types. Some examples include, but are not limited to, sorbitan fatty acid ester, glycerol fatty acid ester, fatty acid-poly(alkylene oxide) adduct, alkyl alcohol poly(alkylene oxide) adduct, alkylphenol poly(alkylene oxide) adduct, poly(alkylene oxide), and silicone-based emulsifiers.

Biocides are optionally used to help to preserve the emulsions. Examples of biocides, include but are not limited to, sodium benzoate, benzisothiazolin, and 3,5-dimethyl-tetrahydro -1,3,5-2H-thiadizine-2-thione (Biocide N-521, "Dazomet").

Appropriate processes have been found to produce emulsions with desired compositions. In addition, the emulsion has to be effective in foam control, to have good phase stability, and capable of being protected from microbiological attack by the use of a suitable biocide.

This is a general method for the preparation of a defoamer emulsion. The method consists of adding hydrophobic particles, such as hydrophobic silica, and a stabilizing agent such as lecithin to the oil blend (triglyceride oil and silicone) at a temperature. The temperature can range from room temperature to 100° C. preferably the temperature is from 50° C. to 90° C. and more preferably from 60 to 80° C. The surfactants are then added and mixed for a period of time to ensure good mixing while maintaining the temperature. Once the blend is uniform, any additional silicone (if any) is slowly added while mixing and maintaining the temperature Next water is blended with the hydrophobic particles, stabilizing agent and oil blend to form an emulsion. Optionally the water can contain polymeric thickener(s). Thus, a uniform dispersion of polymeric thickener(s) is first prepared in water at room temperature prior to addition to making the emulsion. A typical thickener solution is generally at concentration of about 1% based on the amount of water; however, the concentration will depend on the thickener used. The thickener solution is blended using a high-shear mixer if needed to obtain a smooth uniform thickener solution or dispersion. The thickener solution is then added to the hydrophobic particles, stabilizing agent and oil blend. Additional water is added slowly, and the temperature of the emulsion is allowed to drop. An oil-in-water emulsion is formed. If needed, a high-intensity mixer can be used to improve the uniformity of the emulsion.

It has been found that for low silicone contents lower temperatures, such as room temperature, can be used. Hydrophobic particles, such as hydrophobic silica, are mixed into triglyceride oil at room temperature and stirred. The surfactants are then added, followed optionally by polymeric thickener(s) and biocide. A stabilizing agent such as lecithin is then added, followed by one-half of the silicone while stirring. The solution is stirred for a period of time to obtain uniformity, and then the rest of the silicone is added. Water is then added very slowly with vigorous stirring. The final emulsion should have a smooth creamy texture. A person skilled in the art could ascertain what a suitable temperature would be using the information herein.

The following examples will serve to illustrate the invention, parts and percentages being by weight unless otherwise indicated.

EXAMPLES

Example 1

Use of Lecithin as Stabilizing Agent

Several products were evaluated to increase the miscibility of soy methyl ester and silicone oil (Table 1). The evaluation procedure entails the addition of a red dye (i.e. Oil red 0 biological stain from Sigma-Aldrich, St. Louis, Mo.) to highlight the triglyceride oil in a triglyceride oil/silicone oil mixture. Equal amounts of soy methyl ester and silicone oil (i.e. 25 mL of each oil) are mixed in a 100 mL glass container. A 1% concentration by weight of a stabilizing agent based on the weight of the oil blend (e.g., lecithin) was added and well mixed. The mixtures were evaluated for miscibility after one day by measuring with a ruler the separation length of the top layer. Miscibility is reported as a percentage comparison of product vs. no product.

As can be seen from Table 1, Lecigran 5750, a de-oiled lecithin product from Riceland, was found to be successful in increasing the miscibility of silicone oil and soy methyl ester.

TABLE 1

Miscibility between triglyceride oil and silicone oil upon addition of various stabilizing and destabilizing agents. A negative % signifies greater phase separation; a positive % signifies less phase separation as compared to the control (i.e. no stabilizing agent).

| Stabilizing Agent (1%) | Soy methyl ester miscibility (%) |
|---|---|
| No product | 0 |
| Alcolec ® hydroxylated lecithin Z3 (American Lecithin, Oxford, CT) | −20 |
| Alcolec ® S lecithin (American Lecithin, Oxford, CT) | 0 |
| Paniplex ® SK sodium stearoyl lactylate (ADM, Olathe, Kansas) | 20 |
| Panodan ® FDP K (Danisco, New Century, Kansas) | 20 |
| Alacen ® 392 whey protein concentrate (NZMP, Lemoyne, PA) | 40 |
| Lecigran ® 5750 lecithin (Riceland, Stuttgart, Arkansas) | 40 |
| Pluronic ® 31 R-1 copolymers (BASF, Parispanny, NJ) | −40 |

TABLE 1-continued

Miscibility between triglyceride oil and silicone oil upon addition of various stabilizing and destabilizing agents. A negative % signifies greater phase separation; a positive % signifies less phase separation as compared to the control (i.e. no stabilizing agent).

| Stabilizing Agent (1%) | Soy methyl ester miscibility (%) |
|---|---|
| ICM 280 B (Cassopolis, MI) | −20 |
| Surfonic ® CO 30 polyglycol esters of castor oil (Huntsman, Houston, TX) | −20 |
| Pluronic ® L61 copolymers (BASF, Parispanny, NJ) | −60 |

Example 2

Surface Tension for the Blends of Triglyceride Oil and Silicone oil

Surface tension of various vegetable oil mixtures was measured with a Kruss Processor Tensiometer K12 (Kruss USA-NC). This equipment measures surface tension with the Wilhelmy plate method. The technique is well known in the art and it consists of a thin platinum plate suspended from the arm of a balance that dips into a liquid. The container holding the liquid is gradually lowered and the force on the balance is recorded at the point of detachment. The surface tension is calculated from the force of detachment, the weight and perimeter of the plate.

It was found that a 96%:4% mixture of soybean oil: castor oil generated a minimum in surface tension (FIG. 1). A number of samples that varied in the amount of soybean oil and castor oil were made (Table 2). The foam cell results are shown in Table 3. The defoamer efficacy evaluation indicated that the optimal defoamer performance was obtained at a low castor oil: soybean oil ratio, possibly 96% soybean oil and 4% castor oil. This value is in accord with the minimum surface tension.

TABLE 2

Defoamer emulsion composition (all numbers in weight %)

| Ingredients | Def-a | Def-b | Def-c | Def-d |
|---|---|---|---|---|
| Soybean oil | 17.5 | 17.2 | 16.8 | 16.5 |
| Castor oil | 0.4 | 0.7 | 1.1 | 1.4 |
| Lecithin | 0.8 | 0.8 | 0.8 | 0.8 |
| Hydrophobic silica | 1.4 | 1.4 | 1.4 | 1.4 |
| Pulpsil ® silicone 160C (Wacker Chemie AG) | 7.6 | 7.6 | 7.6 | 7.6 |
| Dow Corning ® Q2/5247 silicone (Dow Corning) | 1.7 | 1.7 | 1.7 | 1.7 |
| Span 80 sorbitan monooleate (Uniqema) | 0.4 | 0.4 | 0.4 | 0.4 |
| Tween 20 polysorbate (Uniqema) | 0.2 | 0.2 | 0.2 | 0.2 |
| Xanthan gum | 0.4 | 0.4 | 0.4 | 0.4 |
| Water | 69.4 | 69.4 | 69.4 | 69.4 |
| Biocide N-521 biocide (Verichem) | 0.2 | 0.2 | 0.2 | 0.2 |

TABLE 3

Foam cell results for the defoamer emulsions (all numbers in ml foam, 30 ppm used in the test).

| Defoamer | Soybean oil:Castor oil | $V_{0.75}$ | $V_5$ |
|---|---|---|---|
| Def-a | 98:2 | 35 | 450 |
| Def-b | 96:4 | 40 | 450 |

TABLE 3-continued

Foam cell results for the defoamer emulsions (all numbers in ml foam, 30 ppm used in the test).

| Defoamer | Soybean oil:Castor oil | $V_{0.75}$ | $V_5$ |
|---|---|---|---|
| Def-c | 94:6 | 55 | 485 |
| Def-d | 92:8 | 60 | 465 |

Example 3

Defoamers with Triglyceride Oil and Silicone Oil

Defoamers were evaluated for their defoaming efficacy on a foam cell, consisting of a graduated laboratory-type Nalgene® cylinder, the bottom of which was modified with a draw-off hole to allow drainage and recirculation. For liquid circulation, the black liquor was pumped from the bottom draw-off through a mechanical pump (at a constant speed of 1800 rpm) and pumped the liquor back to the top of the cylinder. Column temperature was controlled using insulating and heating tape. Equal volumes of black liquor were added to the column for each test, and the temperature was kept constant throughout the test (e.g., 80° C.). Foam was generated by introducing air via an unsealed ¼ inch pipe nipple into the recirculation loop. The volume of the foam was measured every 15 seconds for 5 minutes. The defoamer was added to the black liquor just before foam generation. At least one control run was made every day where no defoamer is added. The foam cell conditions were adjusted such that the control run gave a foam volume at 5 minutes ($V_5$) of about 2000 ml. For consistency, all reported values of foam volumes were normalized to $V_5$=1000 ml for the control run for a given day. In the data reported, the normalized foam volumes at 45 seconds ($V_{0.75}$) and 5 minutes ($V_5$) are given.

The results for two defoamers are shown in Table 4. The compositions are shown in Table 5. Defoamer Def-b contains 96:4 soybean oil: castor oil as the triglyceride oil and 0.8% lecithin as the stabilizing agent. Defoamer Def-A contains silicone oil (1000 centistokes viscosity), but no triglyceride oil and lecithin. The two defoamer emulsions give comparable defoaming efficacy. Thus, although the silicone oil is replaced with soybean oil, castor oil, and lecithin, the defoamer efficacy is similar.

TABLE 4

Foam cell results for the defoamer emulsions (all numbers in ml foam)

| Defoamer | Use Level | $V_{0.75}$ | $V_5$ |
|---|---|---|---|
| Def-A | 30 ppm | 60 | 490 |
| Def-b | 30 ppm | 40 | 450 |

TABLE 5

Defoamer emulsion composition (all numbers in weight %)

| Ingredients | Def-A | Def-B |
|---|---|---|
| Vegetable oil blend | 0 | 17.9 |
| Silicone oil, 1000cs | 18.0 | 0 |
| Lecithin | 0 | 0.8 |
| Hydrophobic silica | 1.4 | 1.4 |
| Pulpsil ® 160C silicone (Wacker Chemie AG) | 7.7 | 7.6 |
| Dow Corning ® Q2/5247 silicone (Dow Corning) | 1.7 | 1.7 |
| Span 80 sorbitan monooleate (Uniqema) | 0.4 | 0.4 |
| Tween 20 polysorbate (Uniqema) | 0.2 | 0.2 |
| Xanthan gum | 0.4 | 0.4 |
| Water | 70.0 | 69.4 |
| Biocide N-521 biocide (Verichem) | 0.2 | 0.2 |

Example 4

Variations in the Hydrophobic Coating of Silica

The hydrophobic silica materials used in previous examples are all based on silicone oil, see for example U.S. Pat. No. 3,076,768 issued Feb. 5, 1963, baked on silica. This demonstrates that it is possible to bake triglyceride oils onto silica Triglyceride oils normally do not react with silica Indeed, when a triglyceride oil is heated with silica in nitrogen or under vacuum below 200° C., no substantial reaction is observed. It was discovered that when soybean oil or castor oil is heated in air at 150° C. with silica particles for 3 hours or longer, the oil does react with silica. The resulting vegetable oil-reacted silica particles float on water, indicating its hydrophobic nature.

Example 5

Process for the Preparation of a Defoamer

An example of a general method for the preparation of a defoamer emulsion is as follows. Hydrophobic particles, such as hydrophobic silica, plus lecithin are added to the triglyceride oil (or triglyceride oil mixture) at about 70° C. Other temperatures can be used between room temperature and 120° C. depending of the particular formulation used. A person skilled in the art can ascertain what temperature would be best for their particular formulation. Next, the surfactants are added and mix for 30 minutes maintaining the temperature at about 70° C. Once the blend is uniform, silicone materials are added slowly while mixing and while the temperature is maintained at about 70° C. Separately a uniform dispersion of polymeric thickener(s) is prepared in water at room temperature at about 1% total concentration; a high-shear mixer is used (e.g., IKA T25 homogenizer, Aerolatte milk frother, or Tekmar sonic disruptor, if needed) to obtain a smooth uniform solution or dispersion. This is then added to the oil blend. Additional water at room temperature is added slowly with mixing. A good satisfactory emulsion should be formed when cooled to room temperature. If needed, a high-intensity mixer can be used to improve the uniformity of the emulsion.

Example 6

Process for the Preparation of a Defoamer

This room temperature process is suitable for a defoamer with a lower silicone content. In general, less than about 6% silicone material based on the total emulsion is used for this process although higher percentages can be used such as 8, 10, or 12%. A person skilled in the art would ascertain what percent silicone material works best in their specific formulation. Hydrophobic silica is mixed into triglyceride oil at room temperature and stirred for 30 minutes. The surfactants are then added, followed by polymeric thickener(s) and biocide. Lecithin is added, followed by one-half of the silicone with stirring. Stir for 15 minutes, and then add the rest of the silicone. Water is added very slowly with vigorous stirring. The final emulsion should have a smooth creamy texture.

It is not intended that the examples presented here should be construed to limit the invention, but rather they are submitted to illustrate some of the specific embodiments of the invention. Various modifications and variations of the present invention can be made without departing from the scope of the appended claims.

The invention claimed is:

1. An oil-in-water emulsion which is used to control foam, comprising:
   a) an oil blend comprising: at least one triglyceride oil and silicone oil and/or modified silicone product, wherein the at least one triglyceride oil is selected from the group consisting of soybean oil, corn oil, castor oil, and mixtures thereof and the weight ratio of the silicone oil and/or modified silicone product to the at least one triglyceride oil is from about 6:94 to about 90:10;
   b) a stabilizing agent comprising a phospholipid, included in the oil blend,
   c) hydrophobic particles,
   d) non-ionic surfactants and dispersants, and
   wherein water comprises at least 51% by weight of the total emulsion, wherein the silicone oil and/or modified silicone product content is greater than 2.5% by weight of the total weight of the emulsion and wherein the oil blend, the stabilizing agent, and the surfactants and dispersants all have flash points of 140° F. (60° C.) or higher.

2. The emulsion of claim 1 further comprising thickeners and biocides.

3. The emulsion of claim 1 wherein the amount of the oil blend is from about 5 to about 45% by weight and the amount of the hydrophobic particles is from about 0.05 to about 10.0% by weight based on the total weight of the emulsion.

4. The emulsion of claim 1 wherein the oil blend is from about 7 to about 27% by weight of the total weight of the emulsion and the hydrophobic particles is from about 0.2 to about 5% by weight of the total weight of the emulsion.

5. The emulsion of claim 1 wherein the triglyceride oil is soybean oil.

6. The emulsion of claim 1 wherein the stabilizing agent is lecithin.

7. The emulsion of claim 1 wherein the weight ratio of the silicone oil and/or modified silicone product to triglyceride oil is from about 16:84 to about 86:14.

8. The emulsion of claim 1 wherein the weight of the stabilizing agent is about 0.1 to about 10% of the weight of the oil blend.

9. The emulsion of claim 1 wherein the weight of the stabilizing agent is about 0.5 to about 6.0% of the weight of the oil blend.

10. The emulsion of claim 1 wherein the triglyceride oil comprises a blend of soybean oil and castor oil with a soybean oil to castor oil ratio of from about 80:20 to about 98:2.

11. The emulsion of claim 10 wherein the ratio is from about 90:10 to 95:5 by weight.

12. The emulsion of claim 1 wherein the hydrophobic silica particles comprise the triglyceride oil-coated silica particles.

13. A method of controlling foam in a pulp and paper making systems comprising adding to a pulp and paper making system a composition comprising:
   a) an oil blend comprising at least one triglyceride oil and silicone oil and/or modified silicone product, wherein the triglyceride oil is selected from the group consisting of soybean oil, corn oil, castor oil, and mixtures thereof and the weight ratio of the silicone oil and/or modified silicone product to triglyceride oil is from about 6:94 to about 90:10;
   b) a stabilizing agent comprising a phospholipid, included in the oil blend,
   c) hydrophobic particles, and
   d) non-ionic surfactants and dispersants, and
   wherein water comprises at least 51% by weight of the total emulsion, wherein the silicone oil and/or modified silicone product content is greater than 2.5% by weight of the total weight of the emulsion and wherein the oil blend, the stabilizing agent, and the surfactants and dispersants have flash points of 140° F. (60° C.) or higher.

14. The method of claim 13 wherein the pulp and paper making system comprises Kraft black liquor and wherein the composition is added to the Kraft black liquor.

15. The method of claim 14 wherein the pulp and papermaking system comprises effluent water and wherein the composition is added to the effluent water.

16. An oil-in-water emulsion which is used to control foam, comprising:
   an oil blend comprising:
      triglyceride oil selected from the group consisting of soybean oil, corn oil, castor oil, and mixtures thereof;
      silicone oil, modified silicone product, and/or formulated silicone product; and
      a stabilizing agent comprising a phospholipid,
      wherein the total of the silicone oil, the modified silicone products, and/or the formulated silicone products are approximately 99% of the silicone used and the weight ratio of the silicone oil, modified silicone product, and/or formulated silicone product to the triglyceride oil is from about 6:94 to about 90:10; and
   a non-ionic surfactant and/or dispersant;
   wherein water comprises at least 51% by weight of the total weight of the emulsion; the silicone oil, modified silicone product, and/or formulated silicone product content is greater than 2.5% by weight of the total weight of the emulsion; and the oil blend, the stabilizing agent, and the surfactant and/or dispersant all have flash points of 140° F. (60° C.) or higher.

17. A method of making an oil-in-water emulsion which is used to control foam, comprising:
   coating silica particles with a first triglyceride oil;
   heating the triglyceride oil coated silica particles in air to react the oil with the particles;
   adding the oil-reacted particles and a stabilizing agent comprising a phospholipid to a mixture of a second triglyceride oil and silicone oil and/or modified silicone product, wherein the second triglyceride oil and silicone oil and/or modified silicone product are immiscible in one another and whereby adding the stabilizing agent to the mixture of the second triglyceride oil and silicone oil and/or modified silicone product forms an oil blend;
   adding a surfactant to the mixture of oil-reacted particles and the oil blend; and
   adding water to the mixture of the surfactant and the oil blend to form an emulsion.

18. The method of claim 17 wherein the first and second triglyceride oils are comprised of the same oil.

* * * * *